Feb. 28, 1928.　　　　　　　　　　　　　　　　　　　　1,660,526
L. RICHARDSON
CAR CONSTRUCTION
Filed Aug. 21, 1924

Witness:
R. Burkhardt

Inventor:
Lawrence Richardson,
By Wilkinson, Huxley, Byron & Knight
Attys

Patented Feb. 28, 1928.

1,660,526

UNITED STATES PATENT OFFICE.

LAWRENCE RICHARDSON, OF CHICAGO, ILLINOIS.

CAR CONSTRUCTION.

Application filed August 21, 1924. Serial No. 733,263.

This invention relates to car construction and more particularly to means for limiting the lifting action on the wheels on the light side of the car when the car rocks.

Track irregularities, among other things, cause rocking of the car. Rocking at times becomes excessive to the extent that the light wheels, which are those on the high side of the curve when running at relatively low speeds, are raised off the rail. If occurring under certain circumstances there will be a derailment.

Accordingly, one object of the invention is to provide a simple, durable and efficient arrangement whereby the raising action of the wheels on the high rail on a curve is overcome.

Another object is to provide a simple bearing arrangement adapted to prevent excessive rocking of the car and consequent excessive lightening of the load on the outside or high wheels and to meet the various requirements under service conditions.

These and other objects are accomplished by means of the arrangement disclosed on the accompanying sheet of drawings, in which—

Figure 1:
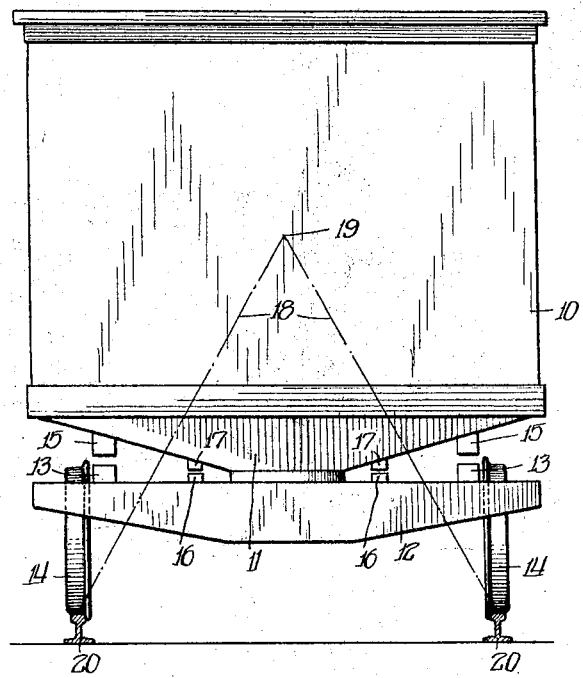
Figure 2:
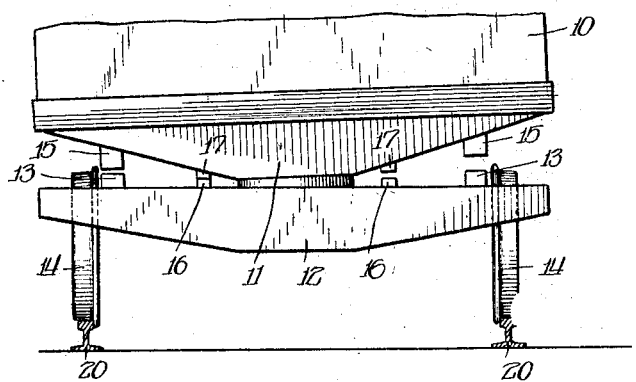

Figure 1 is a fragmentary end elevation of a coal car, somewhat diagrammatic in character, embodying my invention; and Figure 2 is a fragmentary end view of the same showing the body of the car inclined to the extent that inner side bearings are in engagement with each other for limiting rocking movement of the car.

The various novel features of the invention will be apparent from the following description and drawings and will be particularly pointed out in the appended claims.

Referring to the figures of the drawings, it will be noted that the invention is illustrated in connection with a railway car having a body 10, which in this instance is of the type used for carrying coal. This body has a bolster 11. A truck bolster 12 also is provided and may be supported in the usual way.

Heretofore it has been common practice to provide a truck bolster 12 with bearings, such as 13, near the outer ends of said bolster. However, it has been found that on rough tracks the rocking of the car has become so excessive that with one or the other body side bearings 15 in contact with the corresponding truck side bearing 13, the load on the opposite wheel 14 has been lightened enough to permit it to lift, jump or roll over the corresponding rail 20.

To overcome this objectionable feature and to help check the rock of the car before it becomes excessive, I have provided additional side bearings located inwardly with respect to the outer side bearings 13 and 15. The inner side bearings include bearings 16 on the truck bolster 12 and cooperating bearings 17 on the body bolster 11. The inner and outer side bearings may be defined as being on opposite sides of straight lines 18 from the center of gravity 19 of the car to the center of the top of the rails 20.

In view of the fact that the inner side bearings 16 and 17 are to be relied upon chiefly for checking rocking of the car which is not abnormal, the clearance between the associated inner bearings 16 and 17 is considerably less than the clearance between the outer cooperating bearings 13 and 15. This permits them to come into contact first, before 13 and 15 come into contact. Normally, the inner bearings, which are preferably about 36 inches apart, will check the usual rocking movement of the car as shown in Figure 2. However, if the rocking action becomes excessive, the outer side bearings 13 and 15 will come into engagement with each other, this taking place only by a fulcruming movement of the car body, using the inner bearings 16 as a fulcruming point.

By means of this arrangement, normally the rocking of the car will be checked and overcome by the inner side bearings. Heavy blows delivered to the inner side bearings will not lighten the load on the outer or high wheels sufficiently to permit them to climb or jump the outer rail and thereby derail. However, if the rocking movement does become excessive and engagement between the cooperating inner side bearings is not sufficient in effect, engagement between the outer side bearings will supplement the checking action of the inner side bearings to accomplish the desired end. It will be noted that, instead of acting simultaneously, the inner and outer side bearings come into operation successively. When the car body fulcrums on side bearing 16, the periodicity, or number of rocks per time unit, is materially changed and this effectually serves to dampen the rock. Then, too, the outer side bearings only come into contact infrequently with respect to the number of times that the inner bearings come into contact. Inasmuch as derailments can only happen with the outer bearings in contact, the chances for derailments are materially reduced.

I claim:

1. In a railway car, the combination of a truck bolster, a body bolster, and two sets of cooperating side bearings on said bolsters arranged at different distances from the longitudinal center of the car to come into successive action to prevent excessive rocking of the car.

2. In a railway car, the combination of cooperating sets of side bearings located at different distances from the longitudinal center of the car and on the same side thereof to prevent excessive rocking of the car, the clearance between the bearings which are adapted to pass into engagement with each other being different so that the action of said bearings is successive.

3. In a railway car, the combination of a truck bolster, a body bolster, and two sets of cooperating side bearings on said bolsters arranged at different distances from the longitudinal center of the car for preventing excessive rocking of the car, one set of said bearings being located on one side of a straight line connecting the center of gravity of the car with the top of a track rail, and the other set of bearings being located on the other side of said connecting line, said sets of bearings having different clearances whereby they come into action successively.

Signed at Chicago, Illinois, this 18th day of August, 1924.

LAWRENCE RICHARDSON.